UNITED STATES PATENT OFFICE.

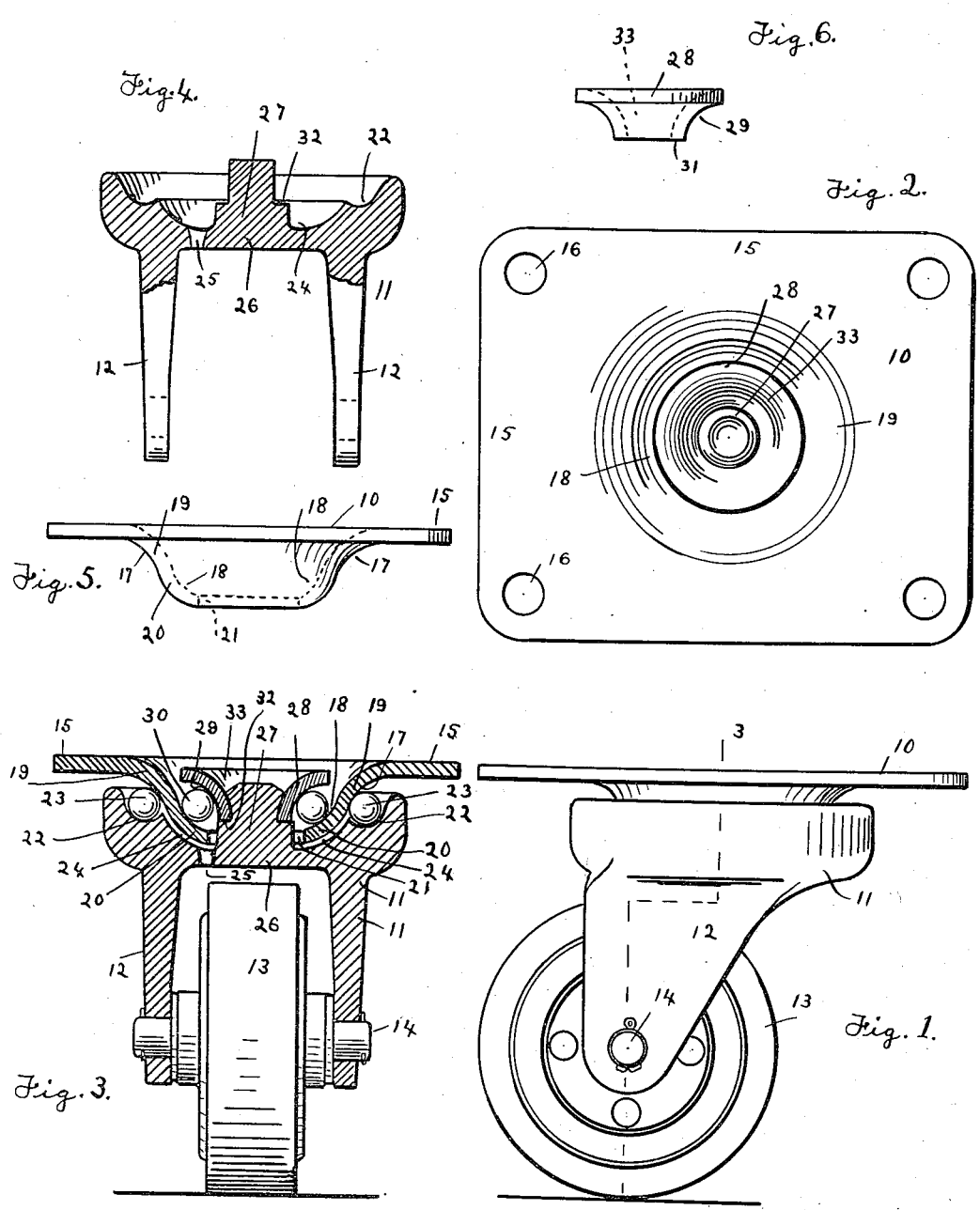

BRADFORD H. DIVINE, OF UTICA, NEW YORK, ASSIGNOR TO DIVINE BROTHERS COMPANY, OF UTICA, NEW YORK, A CORPORATION.

BALL-BEARING CASTER.

1,413,394.  Specification of Letters Patent.  Patented Apr. 18, 1922.

Application filed August 30, 1919. Serial No. 320,774.

*To all whom it may concern:*

Be it known that I, BRADFORD H. DIVINE, a citizen of the United States, and a resident of Utica, in the county of Oneida and State of New York, have invented certain new and useful Improvements in Ball-Bearing Casters; and I do hereby declare that the following is a full, clear, and exact description thereof, which will enable others skilled in the art to which it appertains to make and use the same, reference being had to the accompanying drawings, and to the reference numerals marked thereon, which form part of this specification.

My present invention relates to a ball bearing caster.

The purpose of my invention is to provide a ball bearing caster of improved construction and of such form that it is readily manufactured and yet is very efficient and durable in use.

A further purpose of the invention is to provide a ball bearing caster having two sets of ball bearings so that rolling friction is entirely substituted for sliding friction between the fork member of the caster and the base plate and to provide a caster of the type mentioned which may be readily and permanently assembled so as to be free from working loose.

Another object is to provide a caster having double ball bearings of such construction that the two sets of bearings may be arranged substantially in the same horizontal plane one outside of the other in order to obtain great strength and firmness in the caster and allow the caster to be no greater in height than a non-ball-bearing caster or a caster having one set of ball bearings.

A further purpose of the invention is to provide details of construction and arrangement and combination of the parts that is peculiarly adapted to attain the objects mentioned.

A still further purpose is to provide a double ball-bearinged caster having a race from each set of bearings upon the base plate and a race from each set of bearings upon or rigidly attached to the fork member; and further to provide a caster of the type mentioned where the loose or separate pivot used to connect the base plate and fork member is entirely dispensed with.

Another object is to provide a ball bearing swivel mechanism for casters of such construction that the entire strain transmitted from the caster wheel to the base plate under all conditions of use will be transmitted through ball bearings and all the swiveling motion between the fork and the base plate will be taken entirely in said ball bearings. In other words, it is the purpose of this invention to provide a swivel mechanism for casters of such construction that under all the circumstances of use and wear the turning or friction of the swivel will be taken up entirely in the ball bearing thus obviating wear and deformation of the parts and resulting in a greatly improved caster swivel both in operation and durability.

Figs. 1 and 2 are side and top views respectively of a ball bearing caster embodying my invention.

Fig. 3 is a vertical sectional view on line 3—3 of Fig. 1.

Fig. 4 is a view of the fork member partly in vertical cross-section and partly in front elevation.

Fig. 5 is a front edge view of the base plate.

Fig. 6 is a side view of the cap member which is placed above the base plate and rigidly secured to the fork member.

Referring to the drawings in a more particular description it will be seen that there is shown a caster having a base plate 10 connected to the fork member 11 by two sets of ball bearings. The fork member 11 has the usual downwardly extending forks or legs 12 in which is mounted any desired form of caster wheel 13 as by means of an axle 14 extending through the said wheel and both forks near their lower end.

The base plate 10 which may be of any desired general outline to adapt the caster to be affixed to different articles is here shown as rectangular in general outline, but with the corners rounded. For some distance in from its outer edge the base plate is flat.

In said flat border 15 there are provided suitable holes 16 through which bolts or rivets may be passed to secure the caster to the article to which it is to be applied.

Within this flat border 15 the base plate 10 projects downward and has formed on its lower surface a downwardly facing ball race 17. Concentric with said ball race 17 but therewithin and upon the upper side of the base plate is provided a second or inner ball race 18 facing upwardly.

The construction of the base plate is such that both ball races 17 and 18 are considerably below the level of the flat border of the base plate. A convenient and the preferred way of making the base plate is to form said base plate from a suitable piece of sheet metal of desired shape and size stamped or otherwise formed to leave the flat border 15 and therewithin an inwardly extending and downwardly projecting portion 19 concave on the lower side of the plate with therebeyond a portion 20 extending farther inwardly and downwardly and concave on its upper surface. The portion 19 with its lower surface convex provides the downwardly and somewhat outwardly facing outer ball race 17 while the portion 20 with its upper surface convex provides the upwardly and somewhat inwardly facing inner ball race 18.

The top or upper face of the fork member 12 is provided slightly in from its periphery with a circular depression or channel forming an upwardly and somewhat inwardly facing ball race 22 adapted to co-operate with the outer and downwardly facing race 17 of the base plate 10 by insertion of the proper number and size of the balls 23 between said two races.

Within the race 22 the top or upper surface of the fork member is further cut away or depressed forming a circular pocket 24 into which will extend the lowermost and central depressed portion 20 of the base plate, but without said portion 20 coming into contact with the fork member 12. In practice one or more openings 25 will be provided extending from the bottom of the pocket 24 entirely through the bridge portion 26 of the fork member thus providing an outlet for dirt or foreign substances that may work into either ball bearing.

Centrally of the top of the fork member 12 and rising from within the circular pocket 24 there is provided a projection 27 preferably as shown integral with said fork member. This projection 27 extends upward through the main and central aperture 21 of the base plate and thereabove has mounted on the said projection the annular cap member 28. This cap member as shown most clearly in Figs. 3 and 6 of the drawings is provided with a downwardly and outwardly facing ball race 29 adapted to co-operate with the inner and upwardly facing ball race 18 of the base plate by having the usual balls 30 of proper size and number interposed between said ball races.

It will be understood that this cap member 28 is rigidly and permanently secured in place after the rest of the parts of the caster have been assembled in proper position. A convenient and the preferred form of so rigidly securing the cap 28 to the projection 27 of the fork member is to have the lower edge 31 of said cap set upon an upwardly facing shoulder 32 formed upon the projection 27. Above this shoulder 32 the projection 27 is of reduced diameter and extends upwardly through the central opening 33 of the cap 28. This central opening 33 as plainly indicated in the drawings flares outwardly or becomes larger as it extends upwardly so that after the parts are assembled the upper end of the projection 27 may be readily hammered or rolled down and sidewise into intimate contact with the surrounding inner surface of the cap forming an absolutely tight and permanent joint between the said cap and the projection and therethrough with the fork member 12.

In Fig. 4 is shown the shape of the projection 27 as originally formed while in Fig. 3 is shown its shape after its upper end is hammered or rolled down into locking contact with the cap 28.

It will now be seen that I have provided a ball bearing caster or a ball bearing swivel mechanism for a caster well adapted to serve the purposes and obtain the objects hereinabove mentioned. It will be seen particularly that the construction here shown entirely obviates any strain or wear between the fork member of the caster and the base plate except such as is transmitted directly through the ball bearings. As the ball bearings are well adapted to take that strain and the turning motion they are not strained and the caster, therefore, has a greatly improved and easy and reliable operation and the life of the caster is indefinitely prolonged.

What I claim as new and desire to secure by Letters Patent is:

1. In a ball bearing caster the combination of a base plate having an aperture therethrough and provided thereabouts with an upwardly facing race and a downwardly facing concentric race, a fork member having a race on its upper face adapted to co-operate with the downwardly facing race on the base plate and having an integral projection extending upwardly through the aperture of the base plate, a member on top of the base plate and rigidly secured to the said projection of the fork and provided with a downwardly facing race adapted to co-operate with the upwardly facing race of the base plate, balls interposed between said two pairs of races and a caster wheel mounted in the fork member.

2. In a ball bearing caster the combination of a base plate having an aperture therethrough provided thereabouts with an upwardly facing race and further out from its axis with a larger downwardly facing concentric race, a fork member having a race on its upper face adapted to co-operate with the downwardly facing race on the base plate, a cap above the inner race of the base plate and provided with a downwardly facing race adapted to co-operate with the said inner race of the base plate, means extending through the base plate aperture and rigidly and permanently connecting said fork member and said cap, balls interposed between said two pairs of races and a caster wheel mounted in the fork member.

3. In a ball bearing swivel mechanism for casters the combination of a base plate having an aperture therethrough and provided thereabouts with an upwardly facing race and a downwardly facing race, a fork member having a race on its upper face adapted to co-operate with the downwardly facing race on the base plate and having a projection extending upwardly through the aperture of the base plate, a cap member on top of the base plate rigidly secured to the said projection of the fork provided with a downwardly facing race adapted to co-operate with the upwardly facing race of the base plate and balls interposed between said two pairs of races, said fork member being provided with a downwardly extending aperture therethrough extending from points adjacent to said ball bearings whereby foreign matter may escape from said bearings.

In witness whereof I have affixed my signature, this 26th day of August, 1919.

BRADFORD H. DIVINE.